United States Patent [19]

Schroeder

[11] 4,441,511
[45] Apr. 10, 1984

[54] PNEUMATIC MATERIAL HANDLING SYSTEM FOR COMBINES

[76] Inventor: Douglas K. Schroeder, Rte. 1, Estherville, Iowa 51334

[21] Appl. No.: 360,611

[22] Filed: Mar. 22, 1982

[51] Int. Cl.³ .............................................. A01F 12/44
[52] U.S. Cl. ................................ 130/27 Z; 130/27 R
[58] Field of Search ........................... 130/27 Z, 27 R; 56/14.6, 16.5, 16.6

[56] References Cited

U.S. PATENT DOCUMENTS 3,703,802 11/1972 Wrestler et al. .................. 130/27 R Primary Examiner—Jay N. Eskovitz
Attorney, Agent, or Firm—Williamson, Bains, Moore & Hansen

[57] ABSTRACT

A pneumatic system for harvesting combines which is operable for pneumatically transferring clean grain to the grain tank and for pneumatically conveying the tailings to the threshing cylinder. The pneumatic system includes a clean grain collection tube and a tailings collection tube, each of which is provided with an airlock device which permits grain or tailings to be metered into the pneumatic system while preventing air or grain from escaping therefrom.

2 Claims, 3 Drawing Figures

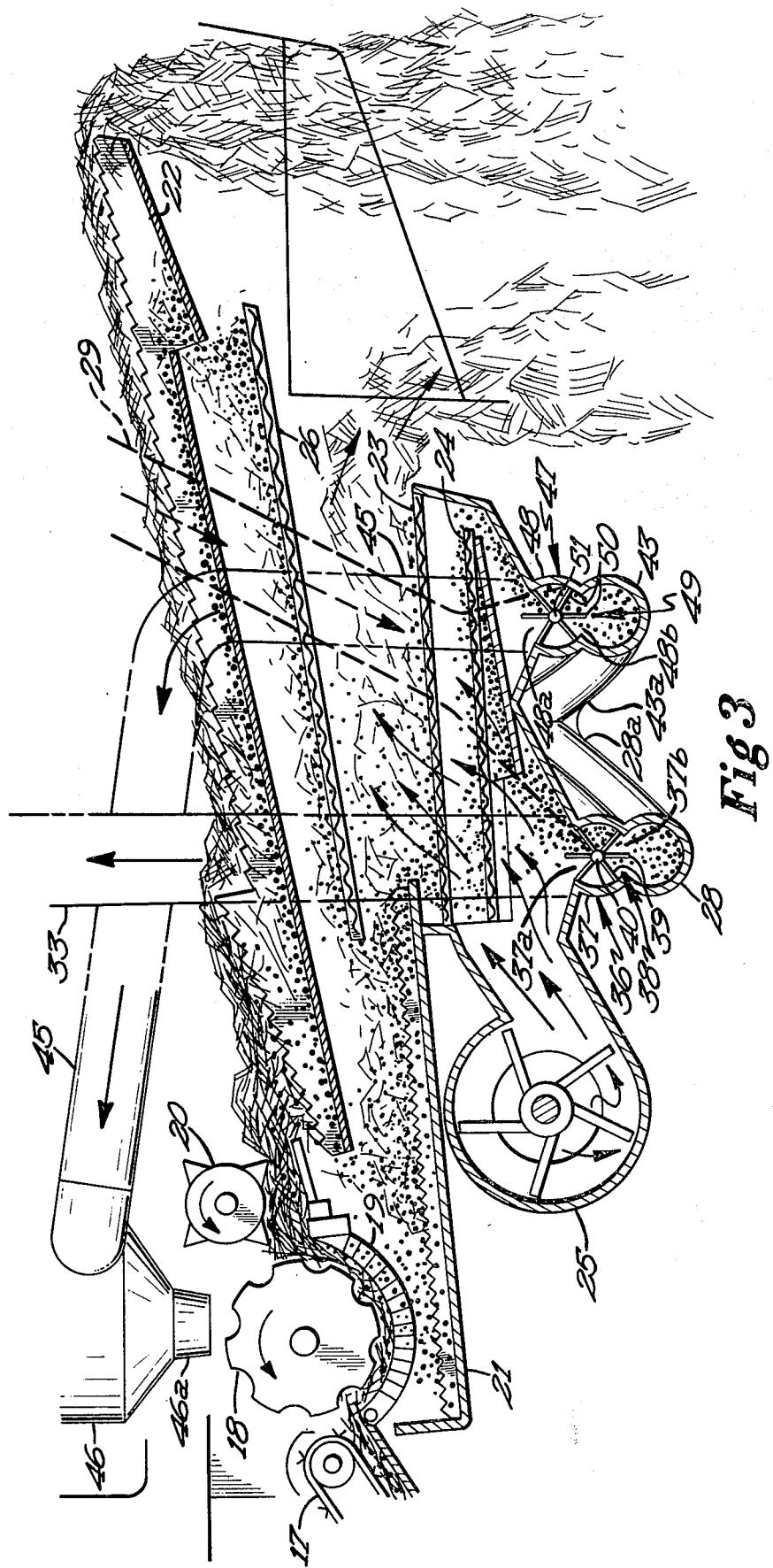

PNEUMATIC MATERIAL HANDLING SYSTEM FOR COMBINES

SUMMARY OF THE INVENTION

This invention relates to harvesting combines and more particularly to a pneumatic system for handling clean grain or tailings in a harvesting combine.

Most commercial harvesting combines have mechanical elevators which convey clean grain or other crops to the clean grain tank and elevators which return the tailings to the threshing cylinder. Conventional auger conveyers are used to transfer the grain or tailings to the respective elevators. It will be appreciated that this type of mechanical material handling system for transferring grain and tailings is comprised of many parts which are subject to wear and maintenance.

It is an object of this invention to provide a harvesting combine with a pneumatic system for transferring the clean grain to the clean grain tank and for conveying the tailings to the threshing cylinder.

A more specific object of this invention is to provide a harvesting combine with a pneumatic system for handling clean grain and tailings including airlock devices which permit grain or tailings to be metered into the pneumatic system while preventing air and grain from escaping therefrom.

These and other objects and advantages of the invention will appear more fully from the following description made in conjunction with the accompanying drawings wherein like reference characters refer to the same or similar parts throughout the several views.

FIGURES OF THE DRAWING

FIG. 3 is an enlarged side elevational view of a portion of the harvesting combine with certain parts thereof broken away to better illustrate the details of construction of the pneumatic handling system.

DESCRIPTION OF THE PREFERRED EMBODIMENT

Figure 1:
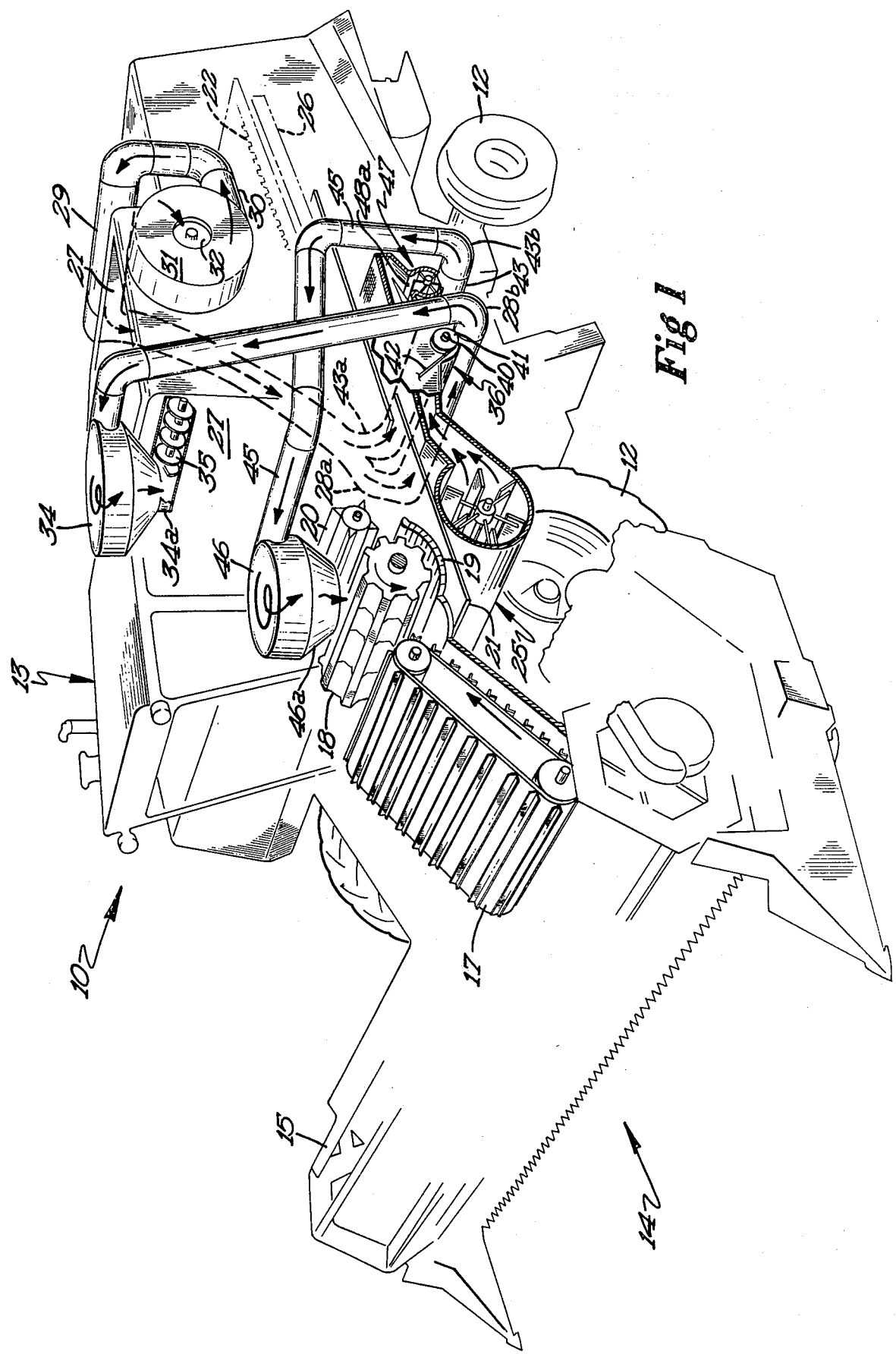
FIG. 1 is a diagrammatic front perspective view of a harvesting combine incorporating the novel pneumatic handling system.
Figure 2:
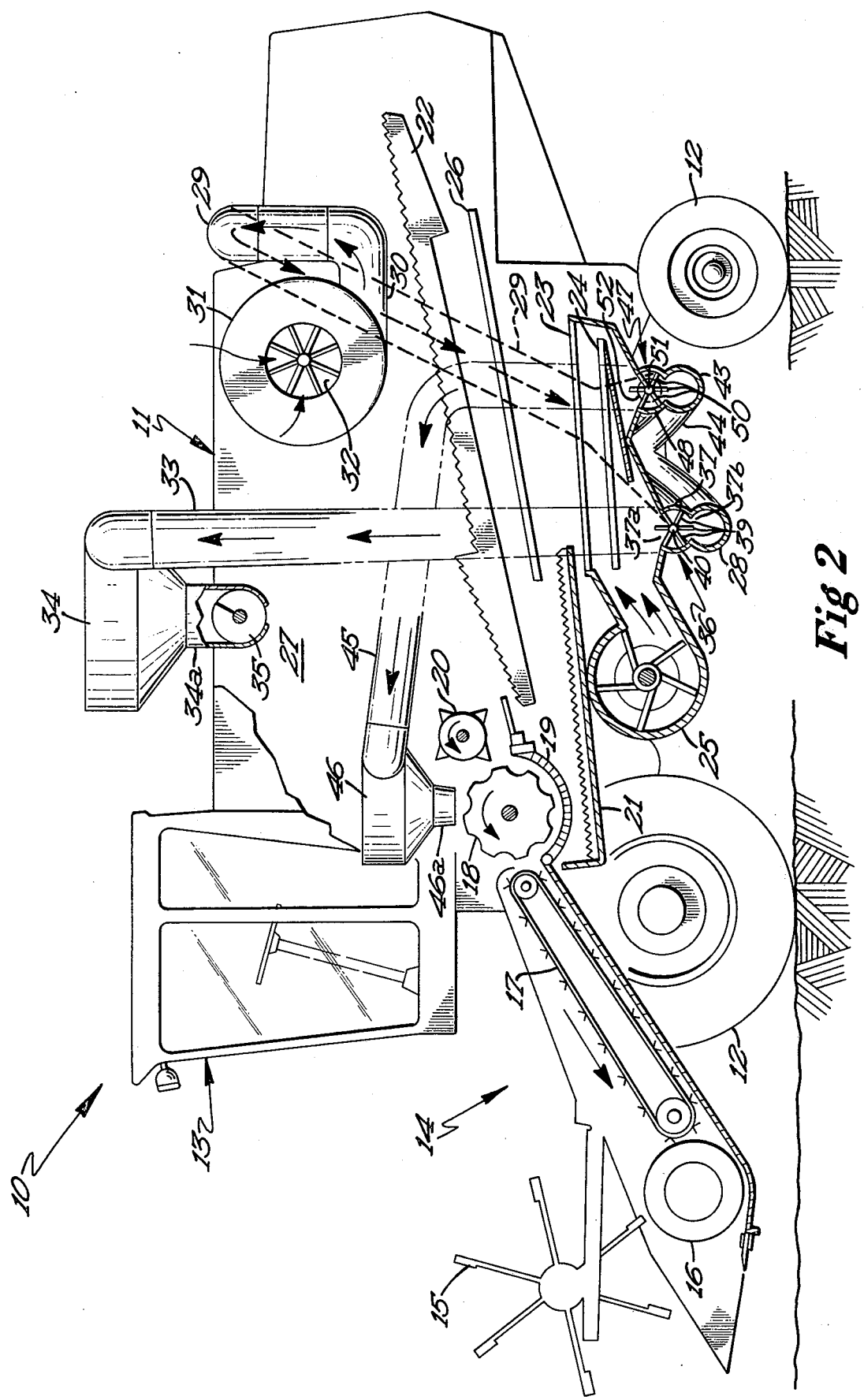
FIG. 2 is a side elevational view of the combine with certain parts thereof broken away for clarity and other parts indicated by dotted line configuration.

Referring now to FIGS. 1 and 2, it will be seen that one embodiment of a conventional commercial combine, designated generally by the reference numeral 10, is thereshown. The harvesting combine 10 is a self-propelled combine and includes a body 11 having ground-engaging propulsion wheels 12 and having a cab 13 in which the operator sits. The combine is provided with a header, such as the header 14 including a reel 15 and auger 16, which moves the harvested crops inwardly towards the feed mechanism 17. The feed mechanism is operable to transfer the harvested crops upwardly and rearwardly towards the threshing cylinder 18 where the initial separation takes place. In the embodiment shown, the threshing cylinder extends transversely of the direction of travel of the harvesting combine, although the present invention may be used with harvesting combines having threshing cylinders arranged longitudinally of the direction of travel.

The threshing cylinder 18 is revolvable and interacts with the concave separator 19 and the beater 20 to separate the usable portion of the crop from the unusable portion thereof. In the event that the harvesting combine is used to harvest grain, the straw is directed rearwardly from the threshing cylinder to the straw-walkers 22 where the straw is moved rearwardly and discharged from the combine onto the surface of the ground. Grain and chaff material fall upon the grain pan 21, and this material is moved rearwardly and falls upon the chaffer sieve 23 and thence upon the shoe sieve 24. Air is directed upon the sieves by a fan 25 to facilitate separation of the grain from the chaff. Grain which is entrained with the straw is returned to the grain pan 21 by return pan 26 which receives the grain from the straw-walkers 22. In conventional combines, the separated clean grain is directed to a grain tank 27 and tailings, including chaff and grain, are returned to the threshing cylinder for recycling the grain and chaff through the separating system.

In conventional combines, the clean grain usually falls into a clean grain auger which moves the grain transversely of the combine to an elevator, and the elevator mechanically moves the grain to the grain tank 27. The tailings are also collected in a tailings auger which conveys the tailings to an elevator and thereafter the tailings are returned to the threshing cylinder zone.

The present material handling system is a pneumatic system and employs a fan for producing the stream of air used in the pneumatic system. It is pointed out that any air producing means, such as air pumps, compressors or the like, may be used. In this regard, the present pneumatic material handling system for the combine includes an elongate, generally cylindrical clean grain collection tube 28 which extends transversely of the body 11 of the combine adjacent the lower portion thereof. The clean grain collection tube has an inlet end 28a which is connected in communicating relation to one end of an elongate conduit 29 which has its other end connected to the outlet 30 of a fan 31. The clean grain collection tube 28 is also provided with an outlet 28b at its other end which is connected to one end of an elongate conduit 33, the other end of the conduit 33 being connected in communicating relation with a cyclone structure 34. The cyclone structure 34 has an outlet 34a that communicates with the grain tank 27 so that air-entrained grain will be directed from the clean grain collection tube 28 through the conduit 33 into the cyclone 34 and will be discharged into the grain tank 27. The grain tank 27 is provided with a conventional leveling auger 35, of well known construction and operation, which serves to level the grain in the grain tank.

Means are provided for metering the amount of grain which passes through the sieves into the clean grain collection tube and this means includes an airlock device 36. The airlock device 36 is comprised of an elongate, generally cylindrical housing 37 which extends substantially throughout the length of the clean grain collection tube 28 and is secured thereto. The housing 37 has an upwardly facing inlet 37a through which grain passes and has an outlet 37b that communicates with the interior of the clean grain collection tube 28 throughout substantially the length of the latter. The airlock device 36 also includes a bladed metering mechanism 38 comprised of an elongate shaft 40 having a plurality of blades 39 secured thereto and projecting radially outwardly therefrom. The end portions of shaft 40 are journaled in suitable bearings (not shown) and one end thereof is provided with a pulley 41 around which is trained a drive belt 42. The drive belt 42 is connected in driven relation with respect to a power outlet source of the combine. Each of the blades 39 has a radial dimension whereby when the blades are rotated, the top of each blade engages the interior surface of the housing 37 to form an air seal thereat.

Referring now to FIGS. 2 and 3, it will be seen that at least two of the blades of the metering mechanism are in engagement with the inner surface of the housing at all times. Therefore, air under pressure passing through the clean grain collection tube will be sealed against escape through the airlock device. It will further be seen that when the clean grain falls downwardly through the sieves by action of gravity, the grain or other crop material will collect between adjacent blades of the metering mechanism 38. Thus predetermined amounts of grain or other crop material will be metered into the clean grain collection tube during each increment of movement of the metering mechanism. The airlock device prevents the escape of air from the clean grain collection tube, and also serves to meter the grain material deposited in the collection tube so that optimum air entrainment of the grain may be accomplished, without disrupting the separator fan.

The novel pneumatic handling system also includes an elongate tailings collection tube 43 which extends transversely of the combine body adjacent the lower portion thereof, and which is positioned rearwardly of the clean grain collection tube 28. The tailings collection tube 43 has an inlet 43a at one end thereof, which is connected by a branch conduit 44 to the conduit 29 for receiving air under pressure from the fan 31. The tailings collection tube 43 is also provided with an outlet 43b which is connected in communicating relation with one end of an elongate conduit 45, the other end of the conduit 45 being connected to a cyclone 46 which is positioned above the threshing cylinder 18. The cyclone 46 has an outlet 46a which permits the tailings to be discharged in the area of the threshing cylinder so that the tailings can be recycled to separate the grain from the chaff. Although only one fan is used to supply air under pressure to the clean grain and tailings collection tubes, separate air producing means for each may be employed.

An airlock device 47 is operably connected with the tailings collection tube 43 and includes an elongate housing 48 which extends substantially throughout the length of the tailings collection tube 43 and is connected thereto. The housing 48 has an upwardly facing inlet 48a and an outlet 48b that communicates with the tailings collection tube 43. The airlock device 47 also includes a bladed metering mechanism 49 comprised of blades 50 affixed to a revolvable shaft 51. The ends of the shaft 51 are journaled in suitable bearings and one end thereof has a pulley 52 affixed thereto for rotation therewith. The belt 42 is trained over the pulley 52 to simultaneously revolve the shaft 51 with the shaft 40 of the airlock device 36. It is pointed out that the airlock device 47 is identical in construction and operation with the airlock device 36. The airlock device 47 permits tailings material to be metered into the tailings collection tube while simultaneously preventing air from escaping from the tailings collection tube into the airlock device housing 48.

It will be seen that during the operation of the combine, clean grain material will be metered into the clean grain collection tube by the airlock device 36 and the grain will be entrained in a stream of air and directed into the cyclone 34 for discharge into the grain tank 27.

Similarly, tailings material will be metered by the airlock device 47 into the tailings collection tube 43 and this tailings material will be entrained in a stream of air and directed through the conduit 45 into the cyclone 46 for discharge into the area of the threshing cylinder 18 for recycling through the grain separation system of the combine.

From the foregoing, it will be seen that I have provided a novel pneumatic material handling system which very effectively conveys grain to the grain collection tank and returns the tailings pneumatically to the cylinder for recycling through the separation system.

It will further be noted that my novel pneumatic system uses a minimum of parts and thereby substantially reduces maintenance and replacement requirements as compared to the conventional elevator system used in most combines. It would also be noted that grain is of better quality when moved in a stream of air, as compared to conventional combines.

Thus it will be seen that I have provided a novel material handling system for a combine which is not only of simple and inexpensive construction, but one which functions in a more efficient manner than any heretofore known comparable system.

While the preferred embodiments of the present invention have been described, it should be understood that various changes, adaptions and modifications may be made therein without departing from the spirit of the invention and the scope of the appended claims.

What is claimed is:

1. In a self-propelled combine of the type including a header, a feed mechanism for feeding crops into the combine, a threshing cylinder for separating grain crops and the like, chaff and straw, straw-walkers for removing straw from the combine, a chaffer sieve for receiving chaff and straw from the cylinder, a clean grain sieve positioned below the chaffer sieve for separating grain from chaff, a cleaning fan for directing air through the sieves to facilitate separation of the grain from the chaff, a grain tank in which grain is collected;

the improvement comprising an elongate clean grain collection tube extending transversely of the combine below the chaffer and clean grain sieves for receiving clean grain therein, said clean grain collection tube having an inlet and an outlet;

a fan for producing a stream of air, a conduit interconnecting said fan with the inlet of said clean grain collection tube for supplying air under pressure to the clean-grain collection tube;

a cyclone structure on said combine and communicating with a grain tank, conduit means interconnecting the outlet of said clean grain collection tube with said cyclone whereby grain in the clean grain collection tube will be entrained in a stream of air and directed to said cyclone to permit grain to be discharged into the grain tank;

an airlock device including an elongate housing positioned above said clean grain collection tube and having an elongate outlet therein communicating with the clean grain collection tube, said housing having an inlet therein for receiving clean grain therethrough;

said airlock device including an elongate driven airlock mechanism positioned in the associated airlock housing and being revolvable relative thereto, said airlock mechanism including a shaft having a plurality of blades secured thereto and extending outwardly therefrom, each blade having a tip portion engaging the inner surface of the associated housing during rotation of the blade to form an airseal thereat, said airlock mechanism being operable to meter a predetermined amount of clean grain into the clean grain collection tube while preventing air under pressure from escaping from the clean grain tube.

2. The combine as defined in claim 1 and a tailings collection tube extending transversely of the combine below the chaffer and clean grain sieves for receiving chaff and grain passing over the rear edge of said sieves, said tailings collection tube having an inlet and having an outlet, conduit means connecting the inlet of said tailings collection tube with said fan for supplying air under pressure to the latter;

a second cyclone mounted on said combine adjacent said cylinder, conduit means connecting said second cyclone structure with the outlet of said tailings collection tube to thereby permit grain and chaff in said tailings collection tube to be entrained in a stream of air and directed to said second cyclone structure whereby said grain and chaff will be returned to the threshing cylinder;

a second airlock device including an elongate housing positioned above said tailings collection tube and having an elongate outlet therein communicating with the tailings collection tube, said airlock housing having an inlet therein for receiving grain and chaff therethrough;

an elongate driven airlock mechanism positioned in the last mentioned airlock housing and being revolvable relative thereto and including a shaft having a plurality of blades secured thereto and extending outwardly therefrom, each blade having a tip portion engaging the inner surface of the last mentioned housing during rotation of the blade to form an airseal thereat, said second airlock device being operable to meter a predetermined amount of clean grain and chaff into the tailings collection tube while preventing air under pressure from escaping from the tailings collection tube.

* * * * *